United States Patent [19]

Stearns et al.

[11] Patent Number: 4,734,791

[45] Date of Patent: Mar. 29, 1988

[54] VIDEO TAPE RECORDER HAVING STATUS DISPLAY MODE

[75] Inventors: John C. Stearns, San Jose; Michael D. Arbuthnot, Redwood City, both of Calif.

[73] Assignee: Ampex Corporation, Redwood City, Calif.

[21] Appl. No.: 850,803

[22] Filed: Apr. 11, 1986

[51] Int. Cl.$^4$ .............................................. H04N 17/06
[52] U.S. Cl. ...................................... 358/335; 360/55; 360/137; 369/50
[58] Field of Search ............... 358/335, 21 R; 360/55, 360/137; 369/29, 50

[56] References Cited

U.S. PATENT DOCUMENTS 4,623,988 11/1986 Paulson et al. .................. 369/29 X
4,641,205 2/1987 Beyers, Jr. ....................... 358/335 X

FOREIGN PATENT DOCUMENTS 147877 9/1983 Japan .................................. 358/335

Primary Examiner—Robert L. Richardson
Attorney, Agent, or Firm—James A. LaBarre; Ralph L. Mossino; Richard P. Lange

[57] ABSTRACT

A video recording and reproducing system provides an operator with the ability to view the status of all operating conditions of a system at one time. When it is desired to view the status, an operator generates a request for a display mode. In this mode, all of the operating conditions are displayed on the television signal monitor in place of normal television signal image information. Information regarding the status of each condition is presented to a character generator, which causes the appropriate status to be placed next to each condition listed on the monitor. All of the information relating to the configuration of the system is thereby provided to an operator at once, and can be viewed not only at the location of the system itself, but also at any remotely located monitors, such as those found in a control booth.

14 Claims, 3 Drawing Figures

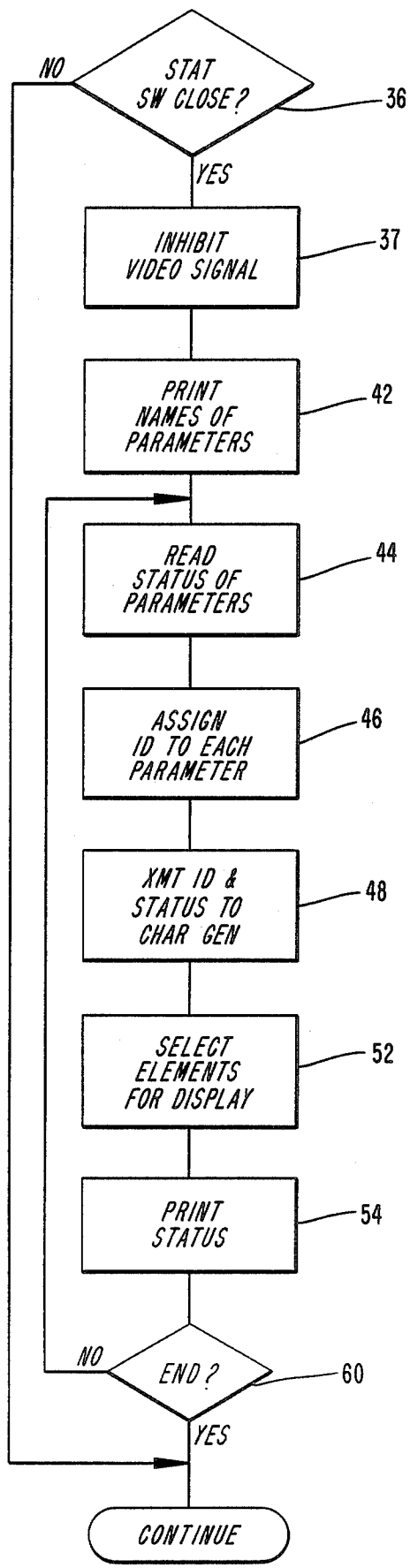

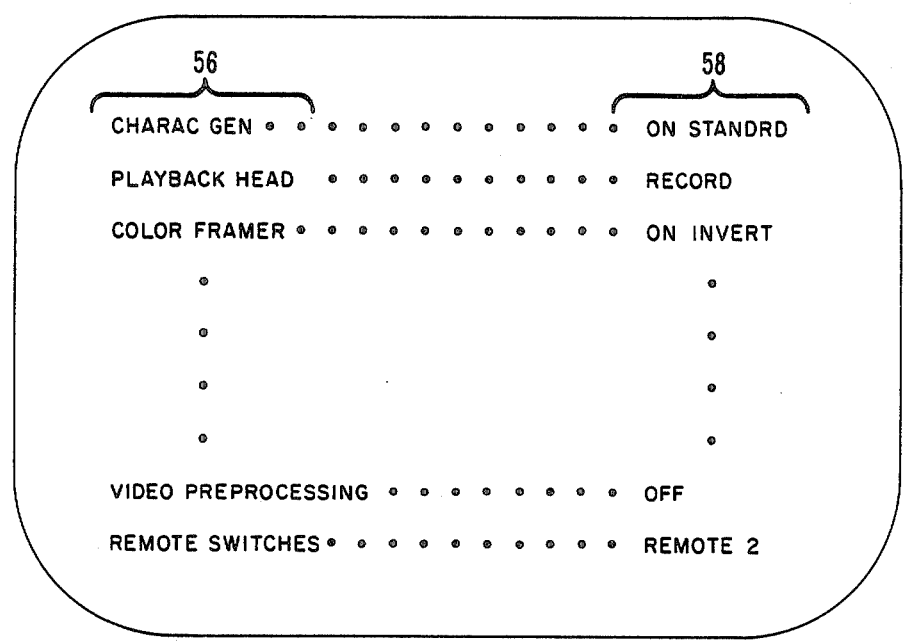

VIDEO TAPE RECORDER HAVING STATUS DISPLAY MODE

BACKGROUND OF THE INVENTION

The present invention is directed to video tape recording and reproducing machines, and in particular to video tape machines of the type that can be configured with different combinations of operating conditions to carry out different types of record and/or reproduce functions.

In broadcast quality video tape recorders which are used to produce television programs and the like, a number of different operating conditions must be set in predetermined states to configure the machine in a particular mode for a desired operation. For example, a character generator can be on or off, and if on it can operate in a standard light character on dark background mode or an inverted mode wherein dark characters are displayed on a light background. If a color frame synchronizing device is employed in the recorder, its control signals can be derived from either a control track recorded along the tape or a synchronizing signal included in the video signal recorded on the tape. Similarly, the video signal transducer must be set in either a record or reproduce mode. There can be 30 or more different operating conditions of this nature that must be set by the machine operator when a particular operation is to be carried out. Editing of television program material on video tape recorders is an example of an operation that requires a great number machine operating conditions to be set to configure the recorder to perform edits.

To assist the operator to configure the machine, some machines have a control panel that includes a dedicated visual display of limited line and page length that sequentially presents menus of messages identifying various conditions to be set. To determine the operating conditions of the machine, the operator must step or scroll this limited display through the menu of possible operating conditions until the selected condition is presented on the display. An example of a video tape machine which operates in such a fashion is the VPR-3 sold by Ampex Corporation of Redwood City, Calif.

After all of the messages of one or more menus have been presented and the operating conditions have been established by the operator, it is often desirable to review the set conditions. Similarly, such a review may be necessary while an editing operation is being carried out or during a change from one operation to the next. In order to do so, it is necessary to again sequentially scroll the display through the series of menu messages. It will be appreciated that this can be a time-consuming and tedious procedure, particularly when there are a large number of operating conditions. Accordingly, it is desirable to provide a more convenient system for enabling an operator to review the configuration of a video tape machine once it has been established.

It is also desirable to increase the accessability of information pertaining to the operating conditions of a video tape machine. More particularly, after the machine has been appropriately configured the operator typically controls its operation from a control booth. This booth is at a location remote from a room in which various tape machines can be found, and is provided with controls for each machine and monitors for viewing video information from all of the machines. If the operator desires to review the status of the operating conditions for a particular machine he must leave the control booth and go to the tape room to view the limited display provided on the machine. It would be much more convenient if the operator could view this information from the control booth, particularly if this could be accomplished without requiring any significant restructuring of the equipment in the booth.

BRIEF STATEMENT OF THE INVENTION

To attain these desirable objectives, the present invention provides a system which enables an operator to view the operating status of all of the system components of interest at one time, and thereby determine the video tape machine's configuration instantaneously. To view the operating states of the components of interest, the operator actuates a switch to generate a signal which places the machine in a status display mode. In this mode, an identification of each of the components of interest is displayed on the television monitor in place of the normal video program that is being read onto or from magnetic tape. Information regarding the operating state status of each component of interest is presented to a message symbol generator, which causes the appropriate operating state status to be listed next to each component identification on the monitor. Thus, the operator can ascertain the status operating states of all of the component of interest at once, rather than having to step through them sequentially one or a few at a time. Since the machine is connected to a video monitor present within the control booth, the operating state status information can be presented there as well.

Further features of the invention are explained hereinafter with reference to a preferred embodiment of the invention illustrated in the accompanying drawings.

BRIEF DESCRIPTION OF THE DRAWINGS

FIG. 2 is a flow chart of the operation of the machine in the status display mode; and FIG. 3 is a representative example of a status display that can be generated on the television monitor of the machine.

DESCRIPTION OF THE ILLUSTRATED EMBODIMENT

Figure 1:
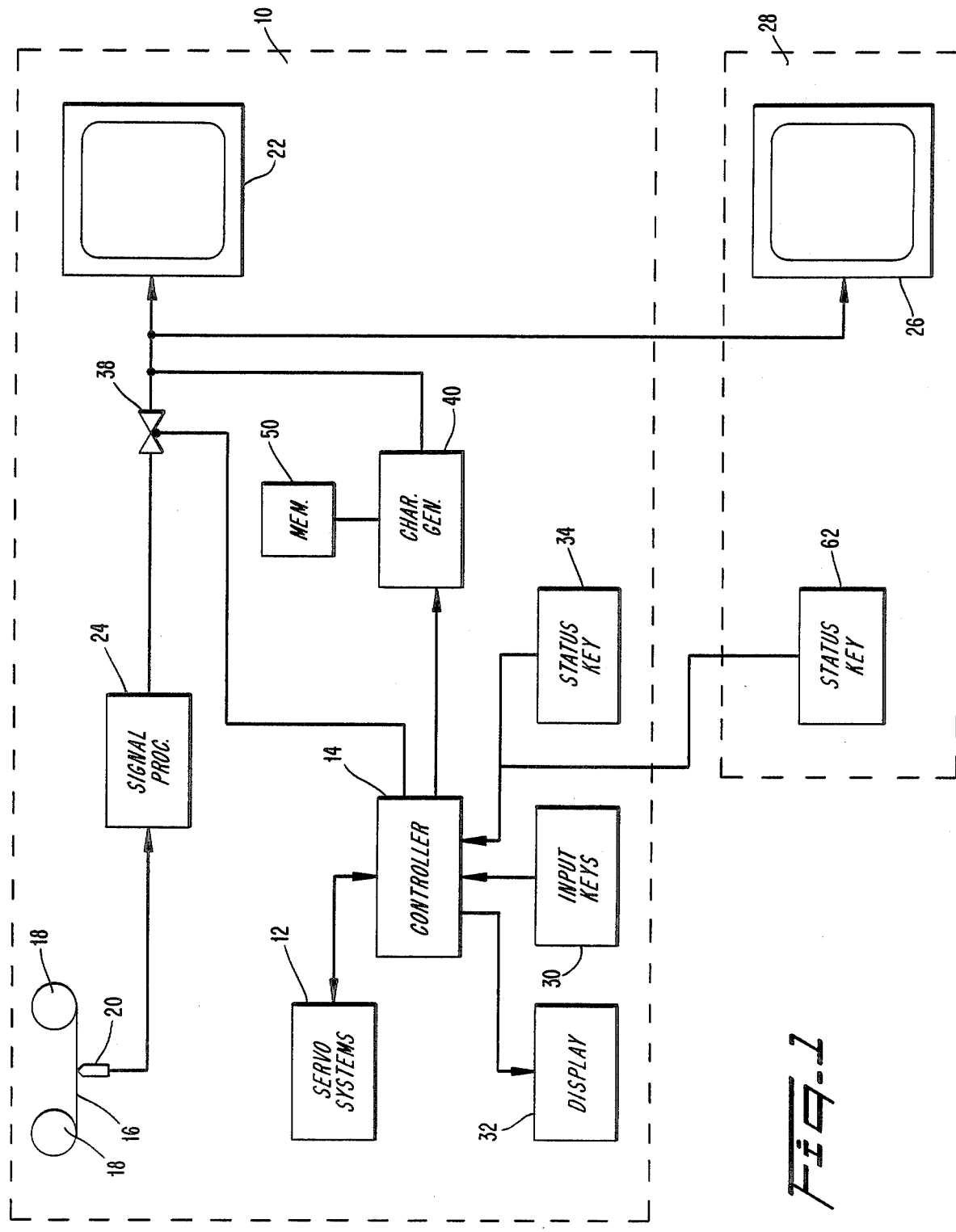
FIG. 1 is a block diagram of a video tape recording and reproducing system which incorporates the present invention.

Referring to FIG. 1, the components of one particular type of video tape recording and reproducing system that incorporates the present invention are illustrated in block diagram form. A video tape machine 10 comprises a plurality of subsystems including servo systems 12 which control various functions in response to commands from a microprocessor-based controller 14. Exemplary of the functions that can be carried out by the servo systems are control of a capstan which regulates the longitudinal speed of a magnetic tape 16 on which video information is recorded, control of the rotational speed of reels 18 around which the tape is wound, and positioning of a magnetic transducer head 20 which writes the information onto the tape and subsequently reads it therefrom. The controller receives input signals, from a number of different sources including the video signal itself and a recorded control track on the tape 15, as well as various external signals such as station reference vertical pulses and timing signals from a master source, as well as operator initiated commands which govern the operating mode of the video tape machine 10. In response to these inputs, the controller issues the commands which regulate the operation of the servo systems to carry out a desired recording and/or reproducing operation.

During the operation of the machine, the video signal that is recorded on or reproduced from the tape 16 is presented to a monitor 22, usually after passing through suitable signal processing circuitry 24 which derives information from the signal for use by the controller 14. This video signal can also be provided to a second monitor 26 in a remotely located control booth 28 for viewing by an operator during the machine operation. The control booth often has a separate monitor for each of a number of video tape machines that are employed during the operation.

In order to configure the machine for a particular operation, the controller is provided with setup signals which indicate the particular sources from which certain ones of the input signals are to be derived, as well as whether various sybsystems are to be active and/or the state in which they are to operate. These setup signals are manually provided by the operator through input keys 30. In response to actuation of these keys, the controller generates different menus on a one-line display 32 of limited message length, whichis provided on the control panel of the video tape machine 10. Each message of the menu enables the operator to view the selection of the operating state or status of one or more of the subsystem parameters which determine the machine operating configuration. The controller has an internal memory which stores values corresponding to the selected operating states for subsequent use during the operation of the machine. In addition, the memory can store one or more sets of preselected parameter status or values which pertain to machine configurations that are frequently employed. Thus, for example, when a standard editing operation is to be performed, one of the stored sets of operating states for the machine subsystems can be called up, thereby eliminating the need to step through each of the menus to configure the machine for that operation.

In accordance with the present invention, whenever the operator desires to review the status of the subsystem operating conditions that have been programmed into the controller, he generates a request by actuating a status key 34. Although this status key is depicted as a separate, stand-alone key in the figure, it can comprise one of the keys in a bank of input keys 30 or the status request signal can be generated by actuating two or more of the input keys 30 simultaneously or in a predetermined sequence. Upon detecting the status request signal, the machine operates in the manner represented by the flow chart of FIG. 2.

Referring now to both FIGS. 1 and 2, when the status request key 34 is actuated (step 36 in FIG. 2) the controller 14 inhibits the presentation of the video signal to the monitors 22 and 26 (step 37). For example, this inhibition might be carried out by deactuating a normally conductive transmission gate 38. The controller also instructs a message symbol generator 40, such as character generator, within the machine to print the names of all of the machine's subsystem parameters of interest on the monitor (step 42). The status of each of the parameters is detected (step 44), for example by retrieving them from the internal memory of the controller, and an identification number is assigned to each subsystem parameter (step 46). This information is transmitted to the character generator (step 48), and used to control the addressing of an internal memory 50 within the generator. More particularly, the memory 50 contains a plurality of look-up tables, one for each subsystem parameter listed on the monitor. The identification number from the controller selects a particular one of the look-up tables, and the associated operating state status signal that is transmitted with the number indicates a particular element of the table, e.g., OFF or ON, that is to be presented to the monitor (step 52). In response to the information from the look-up tables, the character generator 40 causes the detected status of each parameter to be printed adjacent its listing on the monitor (step 54).

In the preferred embodiment, the displayed messages are formed by alpha-numeric characters generated by a common character generator arranged for use in video tape recorders. However, other systematic arrangements of symbols, signs, marks and the like having an understood meaning can be employed to form the messages for communicating operating information to the operator. ICON's are an example of symbols which can be employed to communicate messages. In such language, as few as one ICON symbol can communicate a message that would require several alpha-numeric characters or symbols. Whatever message symbols are selected for communicating status information to an operator, the system of the present invention is provided with a suitable message symbol generator arranged in the manner previously described with reference to the character generator 40.

One example of the type of display that can be presented on the monitor is illustrated in FIG. 3. The left hand portion of the display contains a message listing 56 of the subsystem parameters of interest, which is generated in step 42 of the flow chart. Although the display can list all of the parameters that are available for selection each time the machine is configured for an operation, if this number is large it may be convenient to indicate the operating state status of only the most frequently accessed conditions. The right-hand side of the display 58 indicates the detected operating state status of each subsystem parameter, which is produced in response to steps 44-54 of FIG. 2.

The status display remains on the monitors 22 and 26 until the controller detects a request to end the display at step 60. This request may be generated by a second depression of the status key 34, or any other suitable means for providing such a signal can be employed. Until the request is generated, the controller continues to review the status of the operating state each of the subsystems, and will update the display as appropriate. Thus, if an operator should change the configuration of the machine while the display is on the monitor, the display will be dynamically revised to indicate any changed status conditions.

From the foregoing it will be appreciated that the present invention allows an operator to ascertain the operating state status of all of the machine components of interest at one time by presenting them on the television signal monitor for the machine. In addition to providing quick access to the status of the machine components, it also enables them to be viewed at locations which are remote from the machine itself without significantly restructuring existing equipment. For this purpose, a second status request switch 62 can be provided in the control booth 28. As explained previously with respect to the machine itself, this switch might be a dedicated stand-alone switch, or it could comprise one of the input keys that is already present in such a booth.

In a further modification of the invention, preselected sets of operating states for the machine's components that are store in the controller 14 for particular configurations can also be displayed on the monitors. To provide such a feature, the status request signal could be of a multi-state or programmable nature. Alternatively, the present configuration and all stored configurations can be called up and presented for display in a sequential fashion in response to multiple actuations of the status request key.

It will be appreciated by those of ordinary skill in the art that the present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A video recording and/or reproducing system which facilitates rapid assessment of the operating states of multiple components which determine the configuration of the system, comprising:
   means for recording and/or reproducing a television signal with respect to a video record medium;
   a television signal display monitor for receiving said television signal and displaying images related thereto;
   multiple operating subsystems for controlling said recording and/or reproducing means and the display of images on said monitor, each of said subsystems having at least two selectable operating states to configure the recording and/or reproducing system for a desired mode of operation;
   means for manually selecting an operating state for each of said subsystems;
   means for generating a request to review the current configuration of said system; and
   means responsive to said request for determining the current selected state of each of said operating subsystems and for generating a display of messages on said television signal display monitor which identifies each subsystem and its determined state.

2. The video system of claim 1 further including means for inhibiting the display on said monitor of the image related to television signals during the time that said messages are displayed on said monitor.

3. The video system of claim 1 wherein said recording and/or reproducing means and said message display generating means are incorporated in the video recording and/or reproducing system, and wherein said monitor and said request generating means are located at a position that is remote from said system.

4. The video system of claim 1 further including a memory for storing a preselected state for each of said subsystems during operation of said system in a predetermined mode, and wherein said message display generating means selectively retrieves said preselected states from said memory and causes them to be displayed on said monitor with the identity of each subsystem.

5. In a video tape recording and reproducing machine in which a video signal is reproduced from a tape and displayed on a television monitor and having multiple operating subsystems each of which can be set in at least two different selectable states to configure the machine for a particular mode of operation, a method for indicating the selected states of said subsystems which determine the current configuration of the machine, comprising the steps of:
   generating a request to review the current configuration of said machine;
   detecting the current selected state of each of said subsystems in response to said request; and
   displaying an identification of each of said subsystems and their detected states on said television monitor to thereby indicate the current operating configuration of the machine.

6. The method of claim 5 further including the step of inhibiting the display of video signals on said monitor while the identification of said subsystems and their current states are being displayed.

7. The method of claim 5 wherein said displaying step comprises the steps of generating a first display which identifies each subsystem and simultaneously generating an associated second display which indicates the detected state of each subsystem.

8. The method of claim 5 wherein the step of generating said request is performed at a location that is remote from said machine, and said identification of the subsystems and their states is displayed on a television monitor at said remote location.

9. The method of claim 5 further including the steps of continuing to detect the states of said subsystems while the identifications of said subsystems are displayed on said monitor and dynamically updating said displayed identifications if a change in the state of any of said subsystems is detected.

10. A video signal recording and reproducing apparatus, comprising:
    a plurality of subsystems each having selectable operating states for controlling at least one of the operations of recording and reproducing video information on a record medium;
    a television signal monitor which produces an image related to said video information; and
    means responsive to a request signal for determining the current selected operating state of each of said subsystems and displaying their determined states on said monitor.

11. The apparatus of claim 10 wherein each of said subsystems functions in one of at least two manually selectable states, and the displayed state of each subsystem includes an identification of which of its selectable states has been selected.

12. The apparatus of claim 11 further including means storing a set of preselected respective states for said subsystems, means for generating an alternative request signal, and means for displaying said set of preselected states on said monitor in response to said alternative request signal.

13. The apparatus of claim 12 wherein multiple sets of preselected states are stored in said storing means, and said sets are sequentially displayed on said monitor in response to repeated generation of said alternative request signal.

14. The video system of claim 4 wherein plural sets of preselected states are stored in said memory, and said message display generating means causes each of said sets of preselected states to be sequentially displayed on said monitor with the identity of each subsystem.

* * * * *